(12) United States Patent
Lindqvist et al.

(10) Patent No.: US 7,826,867 B2
(45) Date of Patent: Nov. 2, 2010

(54) WIRELESS TERMINAL HAVING A FLASHLIGHT

(75) Inventors: Timo T. Lindqvist, Teijo (FI); Tapani Ekman, Salo (FI)

(73) Assignee: Nokia Corporation, Espoo (FI)

( * ) Notice: Subject to any disclaimer, the term of this patent is extended or adjusted under 35 U.S.C. 154(b) by 544 days.

(21) Appl. No.: 11/305,683

(22) Filed: Dec. 16, 2005

(65) Prior Publication Data

US 2007/0142081 A1 Jun. 21, 2007

(51) Int. Cl.
*H04M 1/00* (2006.01)
(52) U.S. Cl. ............... 455/556.1; 455/550.1; 455/552.1; 455/556.2; 455/557; 455/573; 455/574; 455/127.1; 455/127.5; 348/220.1; 348/222.1; 348/370; 348/224.1; 370/311
(58) Field of Classification Search ............... 455/556.1, 455/13.4, 522, 572–574, 127.1–127.5, 343.1–343.6, 455/550.1, 552.1, 566.2, 557; 348/370, 220.1, 348/222.1; 370/311
See application file for complete search history.

(56) References Cited

U.S. PATENT DOCUMENTS

| | | | | | |
|---|---|---|---|---|---|
| 5,204,986 | A | * | 4/1993 | Ito et al. ................. | 455/343.1 |
| 6,795,715 | B1 | * | 9/2004 | Kubo et al. ............... | 455/556.1 |
| 6,823,198 | B2 | * | 11/2004 | Kobayashi ................ | 455/556.1 |
| 2002/0049072 | A1 | * | 4/2002 | Usami ........................ | 455/550 |
| 2003/0013484 | A1 | * | 1/2003 | Nishimura et al. .......... | 455/556 |
| 2006/0139480 | A1 | * | 6/2006 | Patino et al. ................ | 348/370 |
| 2006/0189347 | A1 | * | 8/2006 | Bollman et al. ........... | 455/556.1 |

FOREIGN PATENT DOCUMENTS

| | | |
|---|---|---|
| CN | 1728912 | 2/2006 |
| JP | 2002374331 | 12/2002 |
| JP | 2005012609 | 1/2005 |

* cited by examiner

*Primary Examiner*—Edward Urban
*Assistant Examiner*—Junpeng Chen
(74) *Attorney, Agent, or Firm*—AlbertDhand LLP

(57) ABSTRACT

In a wireless communication terminal having a flashlight, the power consumption is decreased by means of enabling a transmitter to transmit during transmission periods, and disabling the transmitter outside the transmission periods. Moreover, a supply of voltage from a common power supply to a flashlight unit is disabled during the transmitting periods of the transmitter.

21 Claims, 1 Drawing Sheet

WIRELESS TERMINAL HAVING A FLASHLIGHT

FIELD OF THE INVENTION

The present invention relates to wireless terminals having a flashlight.

BACKGROUND OF THE INVENTION

The present invention relates to wireless telecommunications in general, and more particularly to mobile terminal battery power conservation. Advanced wireless communication terminals, such as mobile phones, are nowadays equipped with a digital camera. Such a camera allows a user to capture images, to store the captured images on the memory of the mobile terminal, and to transmit these images to third parties. The captured images may be a "still" image (i.e. a single frame, like a conventional photograph) or may be a video clip (i.e. a series of frames captured in quick succession). The captured images may be transmitted in any suitable. However, the light is insufficient nighttime or in a dark environment, the image of the captured photograph will be blurred or unclear. Conventional cameras (including digital cameras) commonly include an additional light source or "flash" that is illuminated while an image is captured in low light conditions. However, wireless terminals are portable devices generally powered by rechargeable battery power sources. Conservation of wireless terminal battery power is desirable in order to allow the wireless terminal to maintain communications for as long as possible. Consequently, the types of light source generally incorporated into conventional film cameras and digital cameras are not the best choice for use in wireless terminals due to their size and power consumption. One approach to reduce the size and power consumption is to use a light emitting diode (LED) device which may be illuminated when an image is captured by a digital camera built into the wireless terminal in order to illuminate the subject of the captured image and thereby provide improved camera performance in low light conditions. Also other flash light techniques for wireless communication terminals have been developed. Moreover, conventional flash light techniques have improved in terms of size and power consumption.

Due to the size and power consumption requirements, the current capability of the batteries used in wireless terminal is quire restricted, and the battery voltage is relatively low, e.g. 2 to 4 volts. The problem is that flash uses relatively high power from the mobile terminal battery if e.g. white LED is used for light generation, and large power consumption pulse occurs during short period of time. The high instantaneous current needed by a flash may drop a supply voltage of the mobile phone low enough to make it inoperative. One approach could be to store the flash energy to a high-value capacitor, for example, but this would increase the price and size of a wireless terminal.

DISCLOSURE OF THE INVENTION

An object of the present invention is to improve operativity of a wireless communication terminal having a flash. The object of the invention is achieved by what is stated in the independent claims. The preferred embodiments of the invention are disclosed in the dependent claims.

In a wireless communication terminal, the power consumption is decreased by means of enabling a transmitter to transmit during transmission periods, and disabling the transmitter outside the transmission periods. Further, a supply of voltage from a power supply to a flashlight unit is disabled during the transmitting periods of the transmitter. The pulsating transmission may be provided by a TDMA technique or a CDMA technique, for example. In an embodiment using the TDMA, a transmitter may be enabled to transmit in one or some of TDMA time slots of a TDMA frame, and a supply of voltage from a power supply to a flashlight unit may be disabled during said one or some of TDMA time slots.

The transmission power may consume several amperes at the highest power slot. Flashlight (e.g. LED) consumption may represent about the same amount of current. If these high power sinks occur at the same time, they are summarized and may cause a voltage drop in power supply terminals. More specifically, the current consumption and ESR (Equivalent Serial Resistance) resistances, summarised to lead and connector resistances generate voltage drop to the power lines and leads to very high battery performance with size and cost penalty, because the internal battery ESR must be extremely low. The same is valid with battery line connectors, folio leads, filtering components, etc.

In embodiments of the invention, the flash is powered with an "inverted" duty cycle compared to the transmitter. The transmitter is driven at first priority and the flash can be controlled on only during other periods. Then the voltage drop over battery and power supply terminals stays at reasonable level because current consumptions are not summarized. The battery and power line ESR do not generate a harmful voltage drop. Battery performance and cost are reduced.

BRIEF DESCRIPTION OF THE DRAWINGS

In the following the invention will be described in greater detail by means of examples with reference to the attached [accompanying] drawings, in which.

DETAILED DESCRIPTION OF THE INVENTION

The invention can be applied to any wireless transmitter terminal which uses a flashlight for generating light for any purpose, such as a camera, security/emergency light, etc. Examples of such wireless terminals include mobile communication terminals for use with $2^{nd}$ generation (e.g. GSM) or $3^{rd}$ generation (e.g. UMTS) mobile communication networks and incorporating a camera function. The wireless terminal could also be a PDA (Personal Digital Assistant) or any other device suited for communication in a wireless communication system and comprising a camera function.

Figure 1:
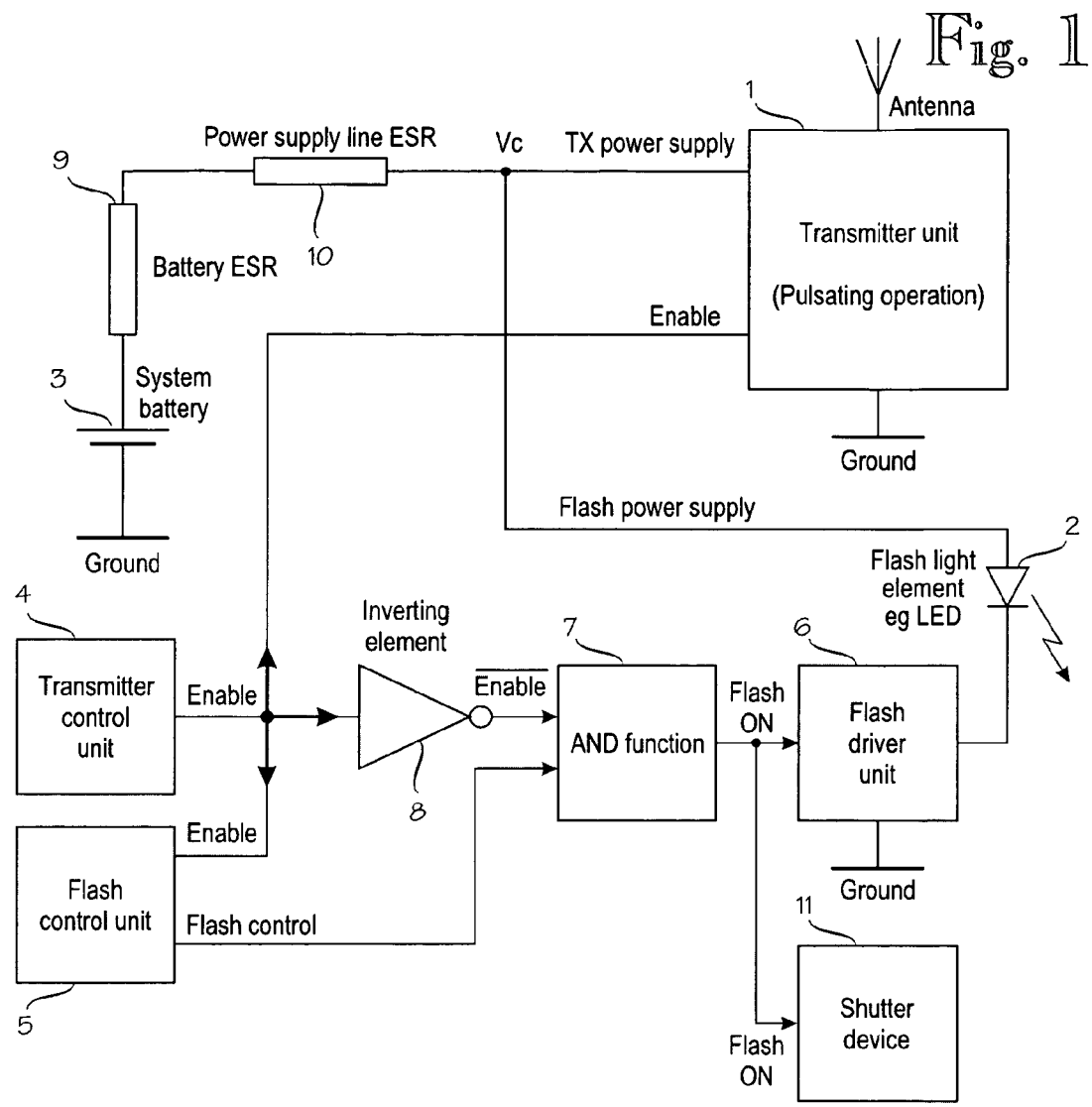
FIG. 1 shows as an example a principal block diagram of a wireless terminal having a flash.

A principal block diagram of an example of a wireless terminal realizing an embodiment according to the present invention is shown in FIG. 1. It should be appreciated that only the operation and elements of the terminal that are needed for understanding, make and use of the present invention are shown. In addition to the ones shown here, a typical wireless terminal may further comprise the usual features and elements of a mobile terminal known in the art, such as a display, arrow keys for scrolling up, down, left and right, number/character input keys and further input keys. Further, a digital camera may be integrated in the mobile terminal, e.g. on the backside and enables to take digital pictures which are then processed and stored in the mobile terminal. An example of a mobile terminal having a camera function is the GSM phone 6710 manufactured by Nokia Inc.

In FIG. 1, the wireless terminal comprises a radio (RF) transmitter unit 1 which includes some type of a RF power amplifier (PA) for generating a pulsating high-power RF transmission signal which is then supplied to an antenna. In an embodiment of the invention, the transmitter unit 1 can operate using a PA pulsating, so that between the actual transmission time periods there are time periods when the power amplifier PA is turned off to avoid any significant current consumption. In the embodiment shown, the transmitter unit 1, or the PA thereof, turned on and off based on a Enable signal from a transmitter control unit 4. The transmitter unit 1 is energized over a power supply line by a power supply which may comprise a system battery or accumulator 3.

Figure 2:
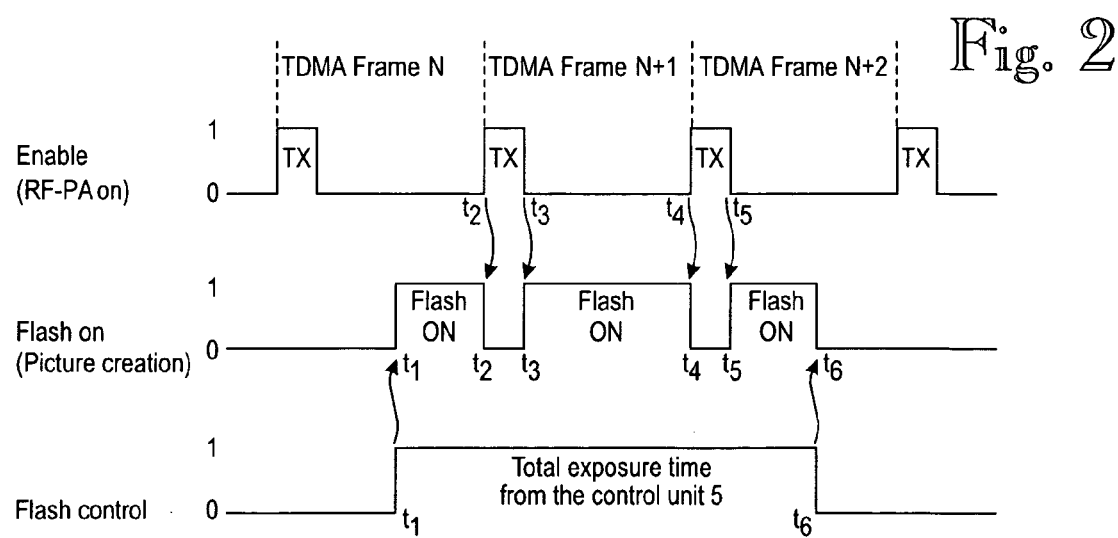
FIG. 2 shows an example of a timing diagram for a terminal shown in FIG. 1.

In an embodiment of the invention, the transmitter 1 is transmitting TDMA (Time Division Multiple Access) signal which comprises consequtive TDMA frames N, N+1, N+2, ..., as illustrated in FIG. 2. Each frame is formed of a number of TDMA time slots, such as 8 time slots. In the example shown, the first time slot (TS0) in each frame is allocated to the wireless terminal for transmission. The Enable signal is in an active state 1 (TX) during the first time slot of each frame only, thereby turning the RF power amplifier (RF-PA) of the transmitter 1 on to transmit within the first time slot and turning the RF power amplifier (RF-PA) of the transmitter 1 off for other time slots (TS1-TS7). More than one time-slot may be assigned to a single terminal in so called multi-slot technique. An example of a wireless terminal in which the invention can be applied is a mobile equipment according to GSM specifications.

However, it should be appreciated that the present invention in not intended to be restricted to the TDMA but any pulsating wireless transmission technique is within the scope of the present invention.

The wireless terminal is also provided with a flashlight element 2 for outputting light, e.g. in order to support the camera function of the wireless terminal 2. The term "flashlight" or "flash", as used herein, refers to any device suitable for generating light in a portable wireless terminal. Examples of such devices include light emitting diode or diodes (LED), Xenon Flash, incandescent lamps, light bulbs, and organic light-emitting diodes (OLED). For example, the flashlight element may be constructed on the backside of the wireless terminal. The flashlight element may also be constructed as an accessory to the wireless terminal, while the power supply 3 of the wireless terminal is used as a power supply for the flashlight element 2, which is advantageous in that the flashlight 2 does not need its own power source. A shutter device 11 may also be provided and operated synchronously with the flash.

In the pulsation operation, the transmitter 1 may consume several amperes at the time slot having the highest power level. The flashlight element 2 also uses relatively high power from the battery power supply 3, if e.g. white LED is used for light generation, and a large power consumption pulse occurs during short period of time. Flashlight power consumption may represent about the same amount of current as that required by the transmitter 1. If these high power sinks occur at the same time, they are summarized and may cause a voltage drop in power supply terminals. More specifically, the current consumption and ESR (Equivalent Serial Resistance) resistances of the battery and the power supply lines 9 and 10, respectively, summarised to lead and connector resistances generate voltage drop to the power lines and leads to very high battery performance with size and cost penalty, because the internal battery ESR 9 must be extremely low. The same is valid with battery line connectors, folio leads, filtering components, etc.

In embodiments of the invention, the flash light element 2 is powered with an "inverted" duty cycle compared to the transmitter 1. The transmitter 1 is driven at first priority and the flash 2 can be controlled on only during other periods. In the example embodiment shown in FIGS. 1 and 2, a flash control unit 5 generates a Flash_control signal at the time the flash is needed for camera operation (the picture creation), for example, but instead of applying the Flash_control signal to a flash driver unit 6 directly, the Flash_control signal is applied to an input of a logical AND circuit 7. An inverted Enable signal from an inverting element 8 is applied to a second input of the AND circuit 7. Thus, the output of the AND circuit 8 connected to a control input of the flash driver unit 8 can be in active state and enable flash only when the Enable signal is inactive, i.e. the transmitter is turned off. The information regarding the transmission periods is provided to the flash control unit 5 in form of the Enable signal, for example, so that the transmission periods and the resulting "turn-off" periods of the flash can be taken into account in calculation of a total exposure time. For example, the exposure time must be extended due to each transmission period occurring during the picture creation.

In the example illustrated in 2, the Flash_control signal goes active (1) at the instant t1. The Enable signal is inactive (0) and the inverted Enable signal active (1). Now both inputs, i.e. the inverted Enable and the Flash_control, to the AND circuit 7 are active (1), which causes the AND output signal Flash_ON to go active (1) and enable the flash. As a result the flash driver unit 6 switches the flashlight element 2 on and opens the shutter device 11. At instant t2, the Enable signal goes active (1) and turns the transmitter unit 1 on at instant for the first time slot of frame N+1. As a result, the inverted Enable signal at the second input of the AND circuit goes inactive (0) which causes also the AND output Flash_ON to go inactive, and the flash power supply is disabled and the shutter 11 is closed, although the Flash_control signal remains active (1). At the instant t3 (at the end of the first timeslot in the frame N+1), the Enable signal goes inactive (0) and the inverted TX enable signal goes active (1). Now both inputs to the AND circuit 7 are again active (1), which causes the AND output Flash_ON to go active and enable the flash and the shutter 11. As a result the flash driver unit 6 switches the flashlight element 2 on. At the instant t4, the Enable signal goes active and turns the transmitter unit 1 on for the first time slot of frame N+2. As a result, the inverted Enable signal at the second input of the AND circuit goes inactive (0) which causes also the AND output Flash_ON to go inactive, and the flash power supply is disabled and the shutter 11 is closed, although the Flash_control signal remains active (1). At the instant t5 (at the end of the first timeslot in the frame N+2), the Enable signal goes inactive (0) and the inverted Enable signal goes active (1) resulting in enabling the flashlight element 2 and the shutter 11. Finally at the instant t6 (at the end of the total exposure time), the Flash_control signal goes inactive, which causes the AND output to go inactive, and the flash power supply is disabled and the shutter 11 is closed. Thus, the flash 2 is controlled inversible to the transmitter unit 1.

Although the control units and logical units are represented as separate functional blocks in the illustrated examples, it should be appreciated that these functions can be realized by a program code executed in a programmable controller, or they can realized by an integrated circuit chip or by discrete circuits, or by various combinations of these different approaches. For example, the transmitter control unit 4 and the flash control unit 5 may provided in a single device either in hardware or in form of a software. As a further example, the control information conveyed by the signals Enable, Flash control, Flash ON, etc., in the illustrated example, is intended to refer any format of information, such as digital data, instructions, data registers, control flags, physical signals, etc.

Even though the invention is described above with reference to examples according to the accompanying drawings, it is obvious for a person skilled in the art that the invention is not restricted thereto but can be modified or implemented in several other ways without departing form the spirit and scope of the appended claims.

The invention claimed is:

1. An apparatus, comprising
a wireless transmitter enabled to transmit during transmission periods and disabled outside said transmission periods during communication,
a digital camera function,
a flashlight unit configured to output additional light to thereby enable capturing digital images by the digital camera function during low ambient light conditions,
a battery power supply configured to supply a voltage for said wireless transmitter and said flashlight, and
a controller configured to disable said supply of voltage to said flashlight unit during transmission periods and to enable said supply of voltage to said flashlight unit during at least some of other periods of said wireless transmitter during an ongoing active communication including a plurality of sequential enabling and disabling periods of said wireless transmitter.

2. The apparatus according to claim 1, wherein said wireless transmitter is enabled to transmit in one or some of TDMA time slots of a TDMA frame, and said controller disables said supply of voltage during said one or some of TDMA time slots.

3. The apparatus according to claim 1, wherein an RF power amplifier of said wireless transmitter is turned on when said wireless transmitter is enabled, and turned off when said wireless transmitter is disabled.

4. The apparatus according to claim 1, wherein said power supply comprises a rechargeable battery.

5. The apparatus according to claim 1, wherein the apparatus comprises a digital camera, and wherein a total exposure time for a camera picture creation is dependent on the time needed for transmission during the picture creation.

6. A circuit for controlling a wireless communication terminal having a transmitter enabled to transmit during transmission periods and disabled outside said transmission periods during communication, a digital camera function, a flashlight unit configured to output additional light to thereby enable capturing digital images by the digital camera function during low ambient light conditions, and a battery power supply supplying a voltage for said transmitter and said flashlight, said circuit comprising a control logic disabling said supply of voltage to said flashlight unit during transmission periods and enabling said supply of voltage to said flashlight unit during at least some of other periods of said transmitter during an ongoing active communication including a plurality of sequential enabling and disabling periods of said wireless transmitter.

7. A circuit according to claim 6, wherein said transmitter is enabled to transmit in one or some of TDMA time slots of a TDMA frame, and said controller disables said supply of voltage during said one or some of TDMA time slots.

8. A circuit according to claim 6, wherein a total exposure time for a picture creation is dependent on the time needed for transmission during the picture creation by a digital camera provided in the terminal.

9. A circuit according to claim 6, wherein said circuit is realized by means of an integrated circuit chip.

10. A circuit according to claim 6, wherein said circuit comprises an executable program.

11. A method, comprising
controlling a wireless transmitter to be turned on during transmission periods and turned off outside said transmission periods,
controlling a battery power supply to drive said wireless transmitter with a supply voltage at a first priority and to drive a flashlight unit with said supply voltage during an ongoing active communication and outside transmission periods of said wireless transmitter during the ongoing active communication including a plurality of sequential enabling and disabling periods of said wireless transmitter, the flashlight unit being configured to output additional light to thereby enable capturing digital images by a digital camera function during low ambient light conditions.

12. A method according to claim 11, comprising enabling said wireless transmitter to transmit in one or some of TDMA time slots of a TDMA frame, and disabling said supply of voltage to the flashlight unit during said one or some of TDMA time slots.

13. A method according to claim 11, further comprising controlling a total exposure time of a digital camera for a camera picture creation based on the transmission period or periods occurring during the picture creation.

14. An apparatus, comprising
a wireless transmitter,
a transmitter control unit generating a transmitter control signal turning the transmitter on during transmission periods and turning the wireless transmitter off outside said transmission periods during an ongoing active communication,
a digital camera function,
a flashlight unit configured to output additional light to thereby enable capturing digital images by the digital camera function during low ambient light conditions,
a battery power supply for said wireless transmitter and said flashlight,
a flash control unit generating a flash control signal,
a flash driver unit turning the flashlight unit on in response to said flash control signal,
logical circuitry responsive to said transmitter control signal for allowing said flash control signal to enable said flashlight driver unit during an ongoing active communication and outside transmission periods during the ongoing active communication including a plurality of sequential enabling and disabling periods of said wireless transmitter.

15. The apparatus according to claim 14, wherein the flash control circuit is configured to control a total exposure time of a digital camera for a camera picture creation based on the transmission periods occurring during the picture creation.

16. The apparatus according to claim 14, wherein at least one of said transmission control signal and said flash control signal is in form of digital information.

17. An apparatus, comprising
a controller configured to control a battery power supply unit to drive a wireless transmitter with a supply voltage during transmission periods and to drive a flashlight unit with said supply voltage during an ongoing active communication and outside transmission periods of said wireless transmitter during the ongoing active communication including a plurality of sequential enabling and disabling periods of said wireless transmitter, the flashlight unit being configured to output additional light to thereby enable capturing digital images by a digital camera function during low ambient light conditions.

18. The apparatus according to claim 17, wherein said controller is realized in an integrated circuit chip.

19. The apparatus according to claim 17, wherein said controller is a programmable controller.

20. The apparatus according to claim 19, wherein said controller comprises a logic circuit.

21. A processor-readable tangible storage medium encoded with a program code that, when executed in a controller, perform:

controlling a battery power supply unit to drive a wireless transmitter with a supply voltage during transmission periods and to drive a flashlight unit with said supply voltage during an ongoing active communication and outside transmission periods of said wireless transmitter during the ongoing active communication including a plurality of sequential enabling and disabling periods of said wireless transmitter, the flashlight unit being configured to output additional light to thereby enabling capturing digital images by a digital camera function during low ambient light conditions.

* * * * *